April 20, 1965     F. BOWERS     3,179,545
METHOD OF MAKING A MULTIPLE STACKED CAPACITOR
Filed July 18, 1962
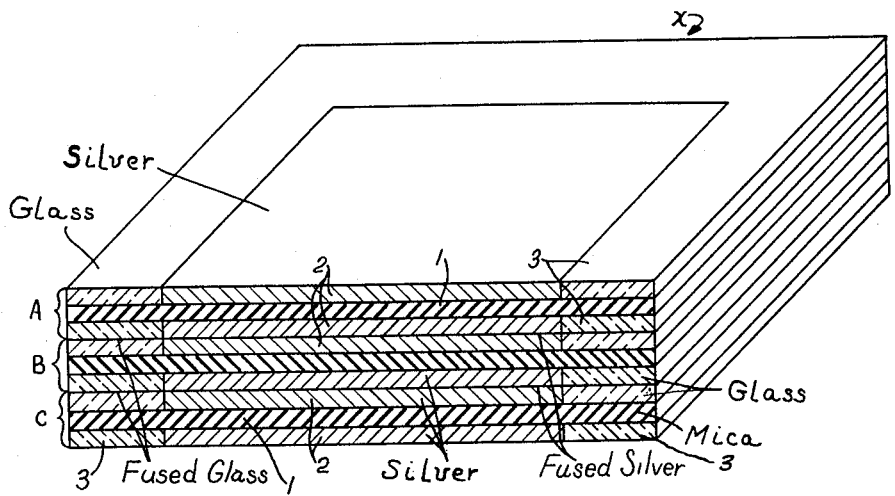
INVENTOR.
Frank Bowers
BY
Pierce, Scheffler & Parker
Attorneys

2

United States Patent Office 3,179,545
Patented Apr. 20, 1965

3,179,545
METHOD OF MAKING A MULTIPLE
STACKED CAPACITOR
Frank Bowers, Stoke-on-Trent, England, assignor to Johnson, Matthey & Company Limited, London, England, a company of Great Britain
Filed July 18, 1962, Ser. No. 210,762
Claims priority, application Great Britain, July 19, 1961, 26,140/61
1 Claim. (Cl. 156—89)

This invention relates to improvements in and relating to electrical capacitors of the kind comprising a sheet of high firing dielectric material, such, for example, as mica, coated with metal which forms the electrodes and is more particularly concerned with multiple capacitor units composed of a plurality of individual capacitors of the above kind disposed one upon another to form a stack and bonded together by the application of heat and pressure to form a composite unit.

As will be readily appreciated, in the case of capacitors the dielectric of which consists of mica or high firing ceramic material, the firing under pressure of a stack of such capacitors to form a unit will cause the bonding together only of the contiguous metal electrodes, which generally do not cover the entire area of the dielectric sheet, and, consequently, no bonding takes place between the unmetallised portions of the dielectrics. Spaces are, thus, left within the stack between the individual capacitors, which for the purpose of preventing the ingress of moisture, are evacuated and then filled or impregnated with wax or other insulating material.

Protection of the capacitor unit against the ingress of moisture is particularly important if the unit is to be used under tropical conditions and, as it has been found that, particularly under such conditions, neither the wax, or other insulating filling, nor the interface between it and the dielectric are effectively impervious to moisture, it has been necessary to provide the unit with an outer protective covering of wax, ceramic or glass. The outer protective covering obviously unavoidably increases both the overall dimensions and the weight of the unit, both of which features are undesirable in view of the requirements of the present-day highly complicated electronic layouts demanding ever smaller and more compact high capacitance units.

The principal object of this invention is to overcome the above disadvantages inherent in multiple capacitor units of the kind referred to.

Another object of the invention is to provide a method of rendering a multiple stacked capacitor unit, of the above kind, impervious to moisture without increasing the size, or, appreciably, the weight, of the unit.

A further object of the invention is to provide a method of bonding together a plurality of individual capacitors, of the kind referred to, to form a composite unit or stack, so as to render the same impervious to moisture without the necessity of providing an external covering for the unit or stack.

With these and other objects mainly in view, the invention contemplates a multiple capacitor unit, of the kind hereinbefore referred to, wherein the spaces formed within the stack between the adjacent dielectric sheets are filled with glass or glass-like material which has been bonded to the adjacent dielectric sheets during the firing of the stack to bond the metallised electrode-forming areas together and form the composite unit, whereby the said unit is effectively protected against the ingress of moisture.

In carrying out the invention in practice, the unmetallised areas of the dielectric sheet of each individual capacitor are, preferably, coated prior to the assembly of the stack, with a layer of glass, or of a glass-like material, the individual so-treated capacitors being then assembled one upon another to form a stack and the so-formed stack fired under pressure to cause the metallised electrode-forming areas and also the glass-coated areas to bond together to form a composite unit, which is thereby effectively protected against the ingress of moisture.

The high firing dielectric material is preferably mica and the electrodes are advantageously formed of silver, although any other suitable metal may, if desired, be used.

Any suitable glass composition, capable of softening at the temperature at which the capacitor unit is fired, may be used to coat the unmetallised areas of the dielectric. We have found, however, that lead borosilicate or lead alkali borosilicate type glasses, are particularly suitable for the purpose of the invention.

For example, a suitable glass for use in carrying out the invention may have the following composition:

| | Parts by weight |
|---|---|
| Red lead | 30 |
| Flint | 7.5 |
| Boracic acid | 12.5 |

The following example illustrates the manner in which the invention may be carried out, as applied to a silvered-mica capacitor unit, it being clearly understood that the invention is in no way limited thereto or thereby.

A plurality of rectangular mica dielectric sheets are first coated on both sides thereof with a layer of silver, to form electrodes, in any manner customary in the art of capacitor manufacture, such as by spraying, brushing or screen printing, the latter method being preferred. The layers of silver cover only a portion of each side of the mica sheet, each layer commencing at a distance from a narrow edge of the sheet and extending to the opposite narrow edge, over this edge and partly back over the opposite side of the sheet. The silver layers are narrower than the width of the dielectric sheet so that unmetallised marginal areas are left along each longitudinal side edge portion of the sheet. The silver electrode layers are, then, fired on to the mica in the usual manner to form individual capacitors.

The unmetallised marginal areas of both sides of the sheet are, now, coated with a layer of a suitable lead borosilicate glass, and the required number of the so-formed capacitors are stacked one on another to provide a capacitor unit having the desired capacitance value.

The stack of capacitors is, then, placed in a press and is heated under pressure at a temperature of about 500° C. to cause the contiguous silver electrode layers and the contiguous glass layers to become bonded together throughout their respective areas (any excess glass being squeezed out in the process), thereby forming a composite multiple capacitor unit, the interior of which is effectively sealed off against the ingress of moisture by the bonded glass areas substantially surrounding the metallisation. As the silver layers remain exposed at the narrow edges of each capacitor forming the unit, lead wires may be readily attached thereto by soldering.

The overall dimensions and weight of the capacitor unit are thus kept to the minimum consistent with the number of individual capacitors employed in building-up the unit, the usual outer protective covering being entirely unnecessary.

Whilst, in the above, one embodiment of the invention has been described by way of example, it is to be understood that the invention is, in no way, intended to be limited to this embodiment but that modifications may be made thereto without departing from the scope of the invention. For example, instead of mica, any other suitable high firing dielectric, which remains unaffected at the firing temperatures employed, may be used and any suitable metal, other than silver, may be utilised to form the electrode layers. Moreover, if desired, the glass or glass-like material may be suitably coloured in order to enhance the external appearance of the capacitor.

The accompanying drawing shows, in sectionalized perspective, a multiple capacitor in accordance with the specific embodiment of the invention which has been described. The capacitor unit, indicated generally by the reference letter X comprises three individual capacitors A, B and C, each of which is composed of a mica dielectric sheet 1, two silver electrode layers 2 bonded to and covering part of said dielectric sheet 1 and glass layers 3 bonded to the areas of the sheet 1 not covered by the electrode layers 2.

What I claim is:

The method of making a multiple capacitor unit which comprises initially forming a plurality of individual capacitors, each said capacitor being formed by applying a layer of electrode-forming metal to and covering a portion only of the areas of opposite faces of a sheet of high-firing dielectric material so as to leave marginal portions of said faces unmetallized, and then applying a layer of glass only to said unmetallized marginal portions, thereafter assembling said individual capacitors into an aligned stack with the electrode layers and glass layers of adjacent capacitors located in actual contact with each other, and then firing said stack of capacitors under pressure to cause the contacting electrode layers and contacting glass layers to bond together to form a composite capacitor unit which is thereby effectively protected against ingress of moisture between the individual capacitors.

References Cited by the Examiner

UNITED STATES PATENTS

| 1,396,897 | 11/21 | Thomas | 317—261 |
| 1,479,315 | 1/24 | Pickard | 317—261 |
| 2,596,134 | 5/52 | Dorst | 317—260 |
| 3,086,150 | 4/63 | Held | 317—258 |

FOREIGN PATENTS

| 607,846 | 9/48 | Great Britain. |
| 870,329 | 6/61 | Great Britain. |

LARAMIE E. ASKIN, *Primary Examiner.*
JOHN F. BURNS, *Examiner.*